United States Patent [19]

Tsivion

[11] Patent Number: 5,540,748
[45] Date of Patent: Jul. 30, 1996

[54] PLANT NUTRIENT METAL-BEARING COMPOSITIONS

[75] Inventor: Yoram Tsivion, Givat Ada, Israel

[73] Assignees: Haim Victor Dana; Benjamin Aharon, both of Korazin, Israel

[21] Appl. No.: 243,913

[22] Filed: May 17, 1994

[30] Foreign Application Priority Data

Dec. 13, 1993 [IL] Israel .......................................... 108028

[51] Int. Cl.⁶ ....................................................... C05F 11/00
[52] U.S. Cl. ............................ 71/11; 71/58; 71/63; 71/64.1
[58] Field of Search ................................... 71/11, 58, 63, 71/64.1

[56] References Cited

U.S. PATENT DOCUMENTS

| | | | |
|---|---|---|---|
| 3,353,949 | 11/1967 | Nau | 71/64.07 |
| 3,869,272 | 3/1975 | Windgasen | 71/1 |
| 4,525,197 | 6/1985 | Eibner et al. | 71/33 |
| 4,581,057 | 4/1986 | Nooden | 71/28 |
| 5,125,950 | 6/1992 | Bertram | 71/11 |
| 5,264,018 | 11/1993 | Koenigsberg et al. | 71/903 |

FOREIGN PATENT DOCUMENTS

| | | | |
|---|---|---|---|
| 1152760 | 8/1983 | Canada . | |
| 200147B | 12/1989 | Hungary . | |
| 18682 | 2/1981 | Japan | 71/11 |
| 886874 | 12/1981 | U.S.S.R. . | |
| 1364464 | 8/1974 | United Kingdom . | |

OTHER PUBLICATIONS

Physiology of Temperate Zone Fruit Frees, Miklos Faust, John Wiley & Sons 1989.
Foliar Nutrition of Fruit Trees, D. Swietlik and M. Faust, Hort. Rev. 6:287–356 1984.

*Primary Examiner*—Wayne Langel
*Attorney, Agent, or Firm*—Watson Cole Stevens Davis, P.L.L.C.

[57] ABSTRACT

A plant nutrient composition and a method of its administration is disclosed, providing plants with one or more metal ions in a form in which said metal ions can be absorbed by plants. The composition comprises a product obtained by mixing said one or more metal ions with a reducing sugar following heating of the sugar under alkaline conditions.

17 Claims, No Drawings

PLANT NUTRIENT METAL-BEARING COMPOSITIONS

FIELD OF THE INVENTION

The present invention is in the field of fertilizers and concerns the production of compositions which bear metal elements for the purpose of administering these metal elements to vegetation for absorption by the vegetation.

BACKGROUND OF THE INVENTION

Various metal ions are essential elements for the nutrition of plants. Deficiency of these metal ions in vegetation is often the cause of poor growth and yield of plants. Iron, manganese, zinc, copper, magnesium and calcium are all important in plant growth. Iron is particularly important.

One limiting factor in the absorption of iron, manganese, zinc and copper by plant roots is that their ions tend to form highly insoluble oxides and this limits their availability. For example, in soil iron ions are present either in their divalent ($Fe^{+2}$) or trivalent ($Fe^{+3}$) form with neutral or alkaline conditions favoring the latter. In the trivalent form, iron ions form highly stable precipitates having a solubility coefficient in the order of $10^{38}$. In consequence, soils in which there is a neutral or basic pH, such as calcareous soil in which the calcium carbonate acts as a buffer maintaining a high pH, iron precipitates rapidly and thus becomes unavailable to plant roots. Administration of iron in a divalent ionic salt has not proved to be sufficiently efficient. Administration of iron in the form of salts by means of spraying is common in agricultural practice. Preparations containing L-77 (Union Carbide), an expensive silicon based wetting agent, together with ferrous sulfate, have become a preparation of choice for various crops in which soil applied iron nutrients are neither sufficiently efficacious or cost effective. Swietlik D. and Faust M. 1984 (Horticultural Reviews, 6:287–356) recommend the use of such preparations for deciduous orchards. Examples are wax flower, persimmon, mango and citrus. Wax flower plants are members of the genus Chamaelaucium which belong to the Myrtaceae family.

Deficiency in iron causes plant leaves to loose chlorophyll. As the deficiency increases the leaves turn yellow or almost white. This symptom is called chlorosis.

Some plants such as wax flower need iron to be more freely available for absorption than other crops. Accordingly, for example, under Israeli environmental conditions it has become agricultural practice to supply iron by spraying the crops with iron sulfate mixed with L-77. During the warm season the crops are sprayed each week whilst in the winter spraying is less frequent.

OBJECT OF THE PRESENT INVENTION

It is an object of the present invention to provide a novel composition for the supplementation of metal ions, particularly iron in vegetation for absorption by plants.

It is a further object of the present invention to provide a composition for the treatment of iron deficiency in plants.

It is a still further object of the present invention to provide a process for preparing a composition containing the above metal ions.

It is a still further object of the present invention to provide a system for administration of the composition to vegetation.

GENERAL DESCRIPTION OF THE INVENTION

The present invention is based on the observations that metal ions can effectively be supplemented to plants within a composition comprising a product of said one or more metal ions with a reducing sugar, after the sugar has been thermally treated.

In accordance with the invention there is thus provided a plant nutrient composition for providing plants with one or more metal ions in a form in which said metal ions can be absorbed by plants, comprising an effective amount of a product obtained by mixing said one or more metal ions with a reducing sugar following heating of the sugar under alkaline conditions.

The term "effective amount" is used to denote an amount of said reaction product which gives rise to a biological effect as a result of absorption of the metal ions by the plants.

Preferably, prior to mixing, the sugar is heated to a period of time of several hours under alkaline conditions. The heating temperature is typically about 70°–100° C.

The present invention further provides a method for administering metal ions to plants, which administration is by means of the above composition.

The composition and method of the invention are applicable for administration of said one or more metal ions both to roots as well as to aerial parts of plants. The products will be administered together with an agriculturally acceptable carrier, the nature of which depends of the form of administration, namely whether it is intended for root or aerial administration. For administration onto aerial pans of plants, the composition will typically comprise a detergent.

Typical metal ions included in the composition of the invention are iron, manganese, zinc, copper, magnesium and calcium.

The composition of the present invention preferably comprises also a surfactant, particularly where the composition is intended for foliar application. The surfactant may be a non-ionic detergent, a cationic detergent or an anionic detergent. Examples of non-ionic detergents are those of the polyoxyethylenesorbitan family, sold under the trade name Tween™ (ICI, U.K.), one of a range of alkylarylpolyether alcohol surfactants, sold under the trade name Triton™ (Rohm & Haas Company, U.S.A.) such as Triton X-100™ or Zoharex A-10™ (Zohar Dalia, Israel). Ionic surfactants may for example by lauryl sulfate and alginic acid. The cationic surfactants may for example be an alkyltrimethylammonium bromide.

The invention will now be illustrated with reference to the following Examples.

EXAMPLE 1

"Glucose/ferrous" based composition with Triton X 40 g of glucose are immersed in 500 ml of water. To this 7–13 g of NaOH is added and the entire mix is stirred until clear solution is formed. After several hours of heating in the temperature range of 70°–100° C. (below boiling) is performed until a dark brown solution at the desired volume is formed. To this ferrous sulfate (60 g $FeSO_4.7H_2O$) is added and the solution stirred. The solution is then brought to the volume of 210 ml, ready for use in the field. In the field the solution is diluted in water to a ratio of 1:30 and 0.025% of detergent Triton X-100 (Rohm & Haas) is added, the solution stirred and subsequently sprayed. The molar concentration of iron in the spray is 0.023M.

EXAMPLE 2

"Glucose/ferric" based composition with Triton X 40 g of glucose are immersed in 500 ml of water. To this 7–13 g of NaOH is added and the entire mix is stirred and heated as in the above example. To this 90 g of iron nitrate $Fe(NO_3)_3.9H_2O$ is added and the solution is stirred. The solution is brought to a volume of 210 ml. In the field it is diluted in water to a ratio of 1:55 and 0.025% of Triton X-100 is added. The solution can then be sprayed. The molar concentration of iron in the spray is 0.01M.

EXAMPLE 3

"Mannose/ferric" based composition with Triton X 40 g of mannose are immersed in 500 ml of water. To this 8–10 g of NaOH is added and the entire mix is stirred and heated as in Example 1. To this 90 g of iron nitrate $Fe(NO_3)_3.9H_2O$ is added and solution stirred. The solution is brought to a volume of 210 ml. In the field it is diluted in water to a ratio of 1:55 and 0.025% of Triton X-100 is added. The solution can then be sprayed. The molar concentration of iron in the spray is 0.01M.

EXAMPLE 4

"Galactose/ferric" based Composition with Triton X 40 g of galactose immersed in 500 ml of water. To this 8–10 g of NaOH is added and the entire mix is stirred and heated as in Example 1. To this 90 g of iron nitrate $Fe(NO_3)_3.9H_2O$ is added and solution stirred. The solution is brought to a volume of 210 ml. In the field it is diluted in water to a ratio of 1:55 and 0.025% of Triton X-100 is added. The solution can then be sprayed. The molar concentration of iron in the spray is 0.01M.

EXAMPLE 5

"Lactose/ferric" based composition with Triton X 80 g α-D-lactose are immersed in 500 ml of water. To this 8–10 g of NaOH is added and the entire mix is stirred and heated as in Example 1. To this 90 g of iron nitrate $Fe(NO_3)_3.9H_2O$ is added and solution stirred. The solution is brought to a volume of 210 ml. In the field it is diluted in water to a ratio of 1:55 and 0.025% of Triton X-100 is added. The solution can then be sprayed. The molar concentration of iron in the spray is 0.01M.

EXAMPLE 6

"Glucose/ferric" based composition with Zoharex 40 g of glucose are immersed in 500 ml of water. To this 8–10 g of NaOH is added and the entire mix is stirred and heated as in Example 1. To this 90 g of iron nitrate $Fe(NO_3)_3.9H_2O$ is added and solution stirred. The solution is brought to a volume of 210 ml. In the field it is diluted in water to a ratio of 1:55 and 0.5% of Zoharex A-10 (Zohar Dalia, Israel) is added. The solution can then be sprayed. The molar concentration of iron in the spray is 0.01M.

EXAMPLE 7

"Glucose/ferric" based composition 40 g of glucose are immersed in 500 ml of water. To this 8–10 g of NaOH is added and the entire mix is stirred and heated as in Example 1. To this 43 g of ferric sulfate $Fe_2(SO_4)_3$ is added and solution stirred. The solution is brought to a volume of 210 ml. In the field it is diluted to a ratio of 1:55 and 0.025% of Triton X-100 is added. The solution can then be sprayed. The molar concentrations of iron in the spray is 0.01M.

EXAMPLE 8

Field Trials a) "Glucose/Ferrous" based composition with Triton X as described in Example 1

(i) 1:30 Dilution ratio applied to a field of Euryops:

A field of Euryops, which was grown for the production of cut flowers, was treated for iron deficiency by the application of iron chelates through the soil and weekly sprays of ferrous sulphate with L-77 wetting agent throughout the summer. The molar concentration of iron in the spray was approximately 0.007M. These treatments, which did not help sufficiently to bring the plants to healthy color and growth perhaps because the soil was slightly calcareous, were stopped.

A single treatment with the preparation of Example 1 was administered one week later. It caused a dramatic increase of green color after 3 days. After 4 days the treated plants were intensely and vividly green.

(ii) 1:15 Dilution ratio applied to a field of wax flower plants:

A field of wax flower plants was treated with ferrous sulphate and L-77 as described in field trial a(i) above with similar results. The treatment was stopped and the preparation described in example 1 was administered one week later save that the solution was diluted to a ratio of 1:15 before addition of 0.025% Triton X-100. The molar concentration of iron in the spray was 0.046M. Spraying resulted in an abnormal intense dark green color in the leaves and a temporary arrest of growth. These effects became apparent within about 2 days.

(iii) 1:30 dilution ratio applied to a field of *Hibiscus sinensis:*

A field of *Hibiscus sinensis* with chlorotic leaves was treated for iron deficiency with the preparation described in example 1. Spraying in a single application resulted in chlorotic leaves turning green within a week.

(iv) 1:30 Dilution ratio applied to a row of *Hibiscus sabdariffa:*

A row of *Hibiscus sabdariffa* with chlorotic leaves was treated for iron deficiency with the preparation described in example 1. Spraying in a single application also resulted in chlorotic leaves turning green within a week.

(v) 1:30 Dilution ratio applied to a bush of Grevillea variety Robin Gordon:

A bush of Grevillea variety Robin Gordon exhibiting symptoms of acute iron deficiency of very chlorotic and partially dried up leaves was treated for iron deficiency with the preparation described in example 1. Spraying in a single application resulted in some leaves beginning to show green coloration after one week and new green shoots appeared after a few more days.

(vi) 1:30 Dilution ratio applied to several grape vines

Several grape vines with severely chlorotic branches were treated with the preparation described in example 1. Spraying in a single application resulted in the appearance of intense green patches on the leaves after one week.

It can be readily seen from the above field trials that the preparation as described in example 1 according to one embodiment of the invention provides an effective composition for treatment of iron deficiency in plants. In particular, all the sprayed chlorotic plants tested responded well to the treatment. Two trials a(i) and (ii) above demonstrated a significant improvement in the condition of Euryops and wax flower within a week after the standard treatment of ferrous sulphate and L-77 was replaced by a single spray application of the preparation described in example 1. In particular the preparation qualitatively produced better greening than the standard treatment and within a shorter time.

b) Glucose/ferrous based composition without detergent but otherwise as described in Example 1

(i) 1:30 Dilution ratio applied to several grape vines:

Several grape vines with severely chlorotic branches were treated with the preparation described in example 1 without the presence of detergents. Spraying in a single application resulted in the appearance of green patches after one week. These were of a less frequent and more patchy nature than seen in field trial a(vi) where detergent was present in the spray.

A comparison of these field trials with and without the presence of Triton X-100 indicates that the preparation described in example 1 in accordance with one embodiment of the invention is active in the treatment of iron deficiency in plants without the addition of said detergent although its presence improves the results.

c) Glucose/ferric based composition with Triton X as described in Example 2

(i) 1:55 Dilution ratio applied to a field of wax flower plants.

A field of wax flower plants was treated with the standard ferrous sulphate and L-77 for several months. This treatment was stopped and the field was divided into three sections. After one week had elapsed since cessation each section was treated as follows:

1. The first was treated by spraying it each week with the above preparation according to one embodiment of the invention.
2. The second was treated by spraying it with ferrous sulphate and L-77 each week.
3. The third was left without any iron treatment as a control.

After one week the three sections showed an ascending order of greening with the part treated with the said preparation exhibiting the most greening. After one month the untreated third section became severely yellow and displayed a marked cessation of growth. The standard ferrous sulphate and L-77 treatment produced light green leaves whereas the first section treated according to one embodiment of the invention was dark green with good growth.

(ii) 1:55 Dilution ratio applied to a plot of asparagus.

A plot of asparagus growing in slightly calcareous soil remained in a severely chlorotic state even though it had been subjected to treatment by weekly spraying with ferrous sulphate and L-77 for several months.

The treatment was stopped and the preparation as described in example 2 was administered one week later by spraying in a single application.

After one week whilst most of the branches had turned green the most chlorotic branches were drying up.

Thus a qualitative comparison of the efficacy of the preparation as described in example 2 with a standard preparation of ferrous sulphate and L-77 in the two crops studied indicates that the former is significantly more efficacious.

c) Persistence of effect

A preparation according to Example 1 was sprayed onto chlorotic wax flower plants and caused greening. A second application performed after one week completely obliterated any signs of yellow color. This color effect lasted from then on for a period of 5 weeks.

In contrast, control plants which were treated with a commercial spray mixture of ferrous sulfate and L-77 (Union Carbide) required treatment with the spray every week, otherwise signs of chlorosis would develop even after one day postponement of each sequential treatment.

d) Injuries to Plant Tissue under iron deficiency (i) Wax flower plants

A field of wax flowers all apparently under iron deficiency stress which resulted in yellow leaves and stems was sprayed with a commercial spray mixture of ferrous sulphate and L-77. Another field of wax flowers was sprayed with a preparation according to Example 2.

After 1 week much of the yellow foliage of the commercially treated plants was shed on the ground.

The plants treated according to the present invention shed only a very small proportion of leaves, typically only from the most stressed branch tips.

(ii) Asparagus

A field of asparagus plants with highly chlorotic branches were treated with a preparation according to Example 2. The most chlorotic branches withered away within a few days whereas the lesser chlorotic branches greened to a remarkable extent.

I claim:

1. An aqueous plant nutrient composition for providing plants with one or more metal ions in a form in which said metal ions can be absorbed by plants, wherein said composition comprises a product obtained by the steps consisting of heating a reducing sugar and water under alkaline conditions to form an aqueous solution and then mixing said aqueous solution with one or more metal ions to form an aqueous solution plant nutrient composition.

2. A composition according to claim 1, wherein the heating is conducted at a temperature between 70°–100° C.

3. A composition according to claim 1, wherein said composition contains one or more metal ions selected from the group consisting of iron, manganese, zinc, copper, magnesium and calcium.

4. A composition according to claim 3, wherein the ions are added in the form of a sulfate or nitrate salt.

5. A composition according to claim 4, wherein the ion source is ferrous sulfate or ferric nitrate.

6. A composition according to claim 5, wherein the molar concentration of ferrous iron is 0.023 and ferric iron is 0.01.

7. A composition according to claim 1, wherein the reducing sugar is selected from the group consisting of glucose, mannose, galactose and lactose.

8. A composition according to claim 1, wherein the composition also includes a detergent.

9. A composition according to claim 8, wherein the detergent is selected from the group consisting of non-ionic detergents of the polyoxyethylenesorbitan family, sold under the trade name Tween, and alkylarylpolyether alcohol surfactants, sold under the trade name Triton or Tergitol (Zoharex A-10).

10. A composition according to claim 9, wherein the detergent is Triton X-100 or Zoharex A-10.

11. A composition according to claim 8, wherein the detergent is selected from the group consisting of lauryl sulfate and alginic acid.

12. A composition according to claim 8, wherein the detergent is the cationic detergent alkyltrimethylammonium bromide.

13. A method of treating metal ion deficiency in plants, which method comprises applying a composition according to claim 1 to the situs of a plant suffering from metal ion deficiency.

14. A method for the treatment of plant chlorosis which comprises applying a composition of claim 1 to the situs of a plant suffering from chlorosis.

15. A composition for root application to a plant of one or more metal ions, said composition comprising a composition of claim 1 and an agriculturally acceptable carrier suitable for soil administration.

16. A composition for application onto aerial parts of plants of one or more metal ions, said composition comprising said composition of claim 1 and an agriculturally acceptable carrier suitable for aerial application onto plants.

17. A method of administration of one or more metal ions to plants, said method comprising administering a composition according to claim 1 to the situs of a plant.

* * * * *